Sept. 25, 1934. T. W. PAUL 1,974,973
LEVER
Filed Jan. 13, 1932
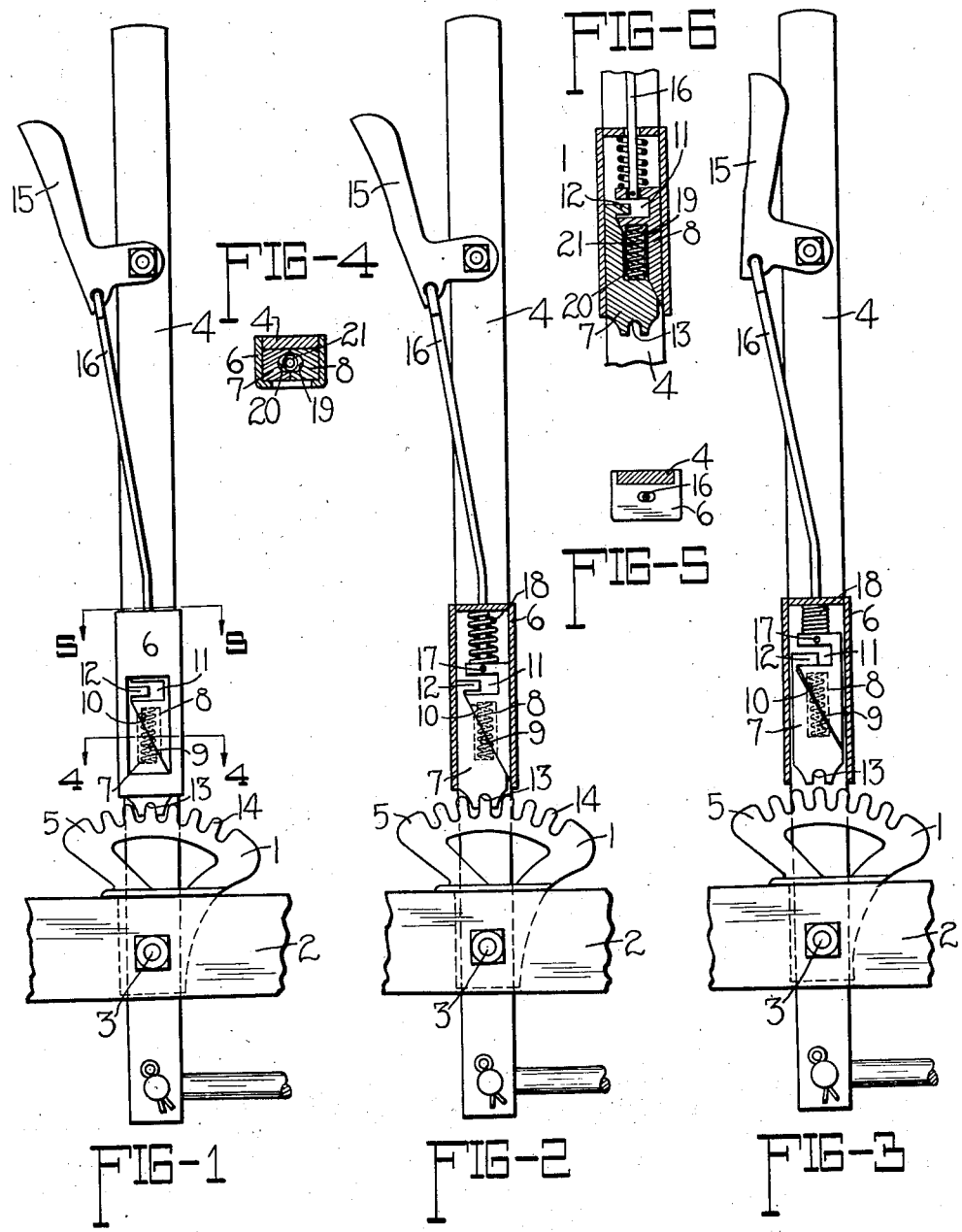
INVENTOR.
Talbert W. Paul.

Patented Sept. 25, 1934

1,974,973

UNITED STATES PATENT OFFICE 1,974,973

LEVER

Talbert W. Paul, Moline, Ill., assignor to Deere & Company, Moline, Ill., a corporation of Illinois Application January 13, 1932, Serial No. 586,258

19 Claims. (Cl. 74—538)

My invention relates to levers of that type commonly used in various mechanical arts, and the object of my invention is to produce a lever simple and rugged in construction and effective in operation.

Referring to the drawing in which similar numerals indicate identical parts—

Figure 1 is a side elevation of my invention with the lever in inoperative position;

Figure 2 is a similar view but with the latch casing in section to show the enclosed parts;

Figure 3 is a view similar to Figure 2 but with the latch dog raised;

Figure 4 is a section on the line 4—4 of Figure 1;

Figure 5 is a section on the line 5—5 of Figure 1; and,

Figure 6 is a vertical transverse section of the casing and enclosed parts.

A sector 1 is rigidly mounted and held on a support 2 by a bolt 3 which also secures the lever 4 to the sector and the support, and operates as the pivot on which the lever rocks. A casing 6 is welded to the lever 4 and encloses the latching device which consists of a dog 7 and a wedge 8, the latter interposed between the dog 7 and a side of the casing 6. The inclined side 9 of the wedge contacts with a similar side 10 of the dog. A slot 11 is formed in the upper part of the wedge 8 and engaging therewith is a projection 12 on the upper end of the dog 7, the slot 11 has a greater vertical width than the projection 12 on the dog 7 so that the dog 7 and the wedge 8 have an independent vertical movement relative to each other for a limited distance. The lower end of the dog 7 has a notch 13 to engage with any one of a series of teeth 14 on the arc of the sector 5. A grip 15, of the usual type, is pivotally mounted on the lever 4 and connected thereto is a rod 16 extending downwardly through a hole in the top of the casing 6 and fastened to the top of the wedge 8 by a pin 17. A coiled spring 18 around the rod 16, within the casing 6, exerts its expansive force between the top of the wedge 8 and the underside of the top of the casing 6. A vertical bore 19 in the inclined side of the wedge 8 registers with a similar bore 20 in the inclined side 10 of the dog 7, the bores forming a vertical chamber in which is carried a light coiled spring 21, the chamber being widened diametrically in one direction to prevent binding the spring 21 against the wall of the chamber as the wedge and dog move relative to each other.

As shown in Figures 1 and 2, the lever 4 is firmly locked to the sector 1, the notch 13, in the dog 7, is engaged with a tooth 14 in the arc 5 of the sector 1 and is held securely from movement by the wedge 8 forcibly acting between the dog and a side of the casing by the expansive force of the spring 18; in this position of the parts the dog 7 has reached the limit of its downward movement and the projection 12 is free from the lower side of the slot 11 a sufficient distance to permit the wedge 8 to be raised without moving the dog 7. In releasing the lever for operation the grip 15 is rocked toward the lever 4 and the wedge 8 is drawn upwardly by the rod 16 breaking the lock of the dog. As the wedge continues to rise the lower side of the slot 11 is brought into contact with the projection 12 on the dog 7 so that the dog rises with the wedge until the notch is free from the tooth on the sector with which it was engaged. As the parts rise the spring 18 is compressed and, as shown in Figure 3, the lever is free to be rocked in the desired direction.

As shown in Figure 3, the dog and wedge are now freed from contact with the sides of the casing 6 so that sufficient space is created between the wedge 8 and the adjacent side of the casing and the dog 7 and the side of the casing next to it to permit the wedge and dog to readily move downwardly. With the upward movement of the wedge the spring 21, in the chamber, expands until the bottom of the slot 11 contacts with the projection 12, but when the wedge is started downwardly the spring 21 forces the dog downwardly simultaneously with the downward motion of the wedge, the parts being so proportioned that the dog 7 is engaged with a tooth of the arc 5 just as the dog contacts with its adjacent side of the casing and the wedge contacts with the side of the casing adjacent thereto, the action of the spring 18 forcing the wedge firmly against the dog and the casing.

My invention is effective in preventing vibration and consequent wear and rattling of the parts, and is a decided advance in its class of lever mechanisms.

What I claim is:—

1. In a lever mechanism, the combination with a sector having teeth on its arc, of a lever, a casing on the lever, a dog within said casing and movable therein longitudinally of said lever and adapted to engage with said teeth to hold the lever inoperative, and means in the casing operating to exert a downward and lateral force against said dog and casing to prevent movement of the dog in the casing while the lever is so held.

2. In a lever mechanism, the combination with a sector having teeth on its arc, of a lever, a casing on the lever, a dog within said casing engageable with said teeth to hold the lever inoperative, a wedge in the casing operating to exert a force directed against said dog at an acute angle to the direction of movement of said dog in said casing to lock the dog in engagement with said teeth and against lateral movement in said casing, and means on the lever connected with said wedge and operative to loosen it from the dog.

3. In a lever mechanism, the combination with a sector having teeth on its arc, of a lever, a casing on the lever, a dog within said casing engageable with said teeth to hold the lever inoperative, a wedge in the casing operating between said dog and a side of the casing to lock the dog in engagement with said teeth, and means on the lever connected with said wedge and operative to loosen it from said dog and raise the wedge, and a connection between said wedge and said dog for causing said dog to be raised when said wedge is raised.

4. In a lever mechanism, the combination with a sector having teeth on its arc, of a lever, a casing on the lever, a dog within said casing engageable with said teeth to hold the lever inoperative, a wedge in the casing operating between said dog and a side of the casing to exert a downwardly and laterally directed force against said dog to lock the dog in engagement with said teeth and against lateral movement in the casing, and a coiled spring expansively operating between the top of the wedge and the top of the casing to force the wedge downwardly.

5. In a lever mechanism, the combination with a sector having teeth on its arc, of a lever, a casing on the lever, a dog within said casing engageable with said teeth to hold the lever inoperative, a wedge in the casing operating between said dog and a side of the casing to lock the dog in engagement with said teeth, a coiled spring expansively operating against the top of the wedge and the inner top of the casing, and means on the lever connected to the wedge and actuable to raise the latter against the pressure of said spring, and means for raising said dog with said wedge.

6. In a lever mechanism, the combination with a sector having teeth on its arc, of a lever, a casing on the lever, a dog within said casing engageable with said teeth to hold the lever inoperative, a wedge in the casing operating between said dog and a side of the casing to lock the dog in engagement with said teeth, a coiled spring expansively operating against the top of the wedge and the inner top of the casing, means on the lever connected to the wedge and actuable to raise the latter against the pressure of said spring, and a lost motion connection between said wedge and said dog through which said dog is raised with said wedge after said wedge has been raised a limited distance.

7. In a lever mechanism, the combination with a sector having teeth on its arc, of a lever, a casing on the lever, a dog within the casing engageable with said teeth to hold the lever inoperative, a wedge in the casing operating between the dog and a side of the casing to lock the dog in engagement with said teeth, a vertical chamber formed partly in said dog and in said wedge in the contacting surfaces thereof, means on the lever connected to said wedge operative to raise said wedge and releasable to permit said wedge to move downwardly, means to force said wedge downwardly, and a spring in said chamber forcing the dog downwardly simultaneously with the downward movement of the wedge.

8. In a lever mechanism, the combination with a sector having teeth on its arc, of a lever, a casing on the lever, a dog in the casing engageable with said teeth to hold the lever inoperative, a wedge in the casing operating to lock the dog in engagement with said teeth, a vertical chamber formed partly in the dog and partly in the wedge in the contacting surfaces thereof, means on the lever connected to said wedge operative to raise the wedge and releasable to permit said wedge to move downwardly, a spring expansively operating between the top of the wedge and the inner top of the casing to move said wedge downwardly, and a coiled spring in said chamber forcing the dog downwardly simultaneously with the downward movement of the wedge.

9. In a lever mechanism, the combination with a sector having teeth in its arc, of a lever, a casing on the lever, a dog in the casing engageable with said teeth to hold the lever inoperative, a wedge in the casing operating to lock the dog in engagement with said teeth, a vertical chamber formed partly in the dog and partly in the wedge in the contacting surfaces thereof, means on the lever connected to said wedge operative to raise the wedge and releasable to permit said wedge to move downwardly, a spring expansively operating between the top of the wedge and the inner top of the casing to move said wedge downwardly, and a coiled spring in said chamber forcing the dog downwardly simultaneously with the downward movement of the wedge, and a projection on said dog adapted to be engaged by said wedge when the wedge is raised whereby said dog is raised simultaneously with said wedge.

10. In a lever mechanism, the combination with a sector, of a lever mounted for rocking movement in one plane about a pivot, a guide on said lever, a dog slidably disposed in said guide for movement radially of said pivot and adapted to engage said sector to hold the lever against movement, and means reacting against one side of said guide for applying a force in said plane at an acute angle to the direction of movement of said dog in said guide to urge said dog into engagement with said sector and also against the other side of said guide to hold said dog in engagement with said sector and to prevent said dog from moving relative to said guide.

11. In a lever mechanism, the combination with a sector, of a lever, a guide on said lever having two parallel sides, a dog slidingly disposed in said guide, means for urging said dog into engagement with said sector, and a wedge in said guide operating against one side of said guide and against said dog urging said dog against the opposite side of said guide to lock said dog in engagement with said sector and against movement relative to said guide.

12. In a lever mechanism, the combination with a sector, of a lever, a guide on said lever having two parallel sides, a dog slidingly disposed in said guide, means for urging said dog into engagement with said sector, a wedge in said guide operating against one side of said guide and against said dog urging said dog against the opposite side of said guide to lock said dog in engagement with said sector and against movement relative to said guide, means for separating said wedge and said dog, and a lost motion connection between said wedge and said dog for causing said dog to move away from said sector upon continued movement of said wedge.

13. In a lever mechanism, the combination with a sector, of a lever mounted for movement relative to said sector, a guide on said lever, a dog longitudinally movable in said guide and engageable with said sector to lock said lever against movement, means reacting against one side of said guide for exerting a force against said dog having a lateral component urging said dog against the other side of said guide and a longitudinal component urging said dog into engagement with said sector, and means for disabling said last means.

14. In a lever mechanism, the combination with a sector, of a lever mounted for movement relative to said sector, a guide on said lever, a dog longitudinally movable in said guide and engageable with said sector to lock said lever against movement, means reacting against one side of said guide for exerting a force against said dog having a lateral component urging said dog against the other side of said guide and a longitudinal component urging said dog into engagement with said sector, and means for disabling said last means and for moving said dog away from said sector.

15. In a lever mechanism, the combination with a sector, of a lever mounted for movement relative to said sector, a guide on said lever, a dog longitudinally movable in said guide and engageable with said sector to lock said lever against movement, means for exerting a force against said dog having a lateral component urging said dog against the side of said guide and a longitudinal component urging said dog into engagement with said sector, and means for disabling said last means, and means for applying a longitudinal force against said dog prior to the application of said other force.

16. In a lever mechanism, the combination with a sector, of a lever mounted for movement relative to said sector, a guide on said lever, a dog longitudinally movable in said guide and engageable with said sector to lock said lever against movement, a longitudinally movable member, means cooperating with said member to cause the latter to exert a force against said dog having a lateral component urging said dog against the side of said guide and a longitudinal component urging said dog into engagement with said sector, and means connected with said member to move the latter in a direction to release the force exerted against said dog.

17. In a lever mechanism, the combination with a sector, of a lever mounted for movement relative to said sector, a guide on said lever, a dog longitudinally movable in said guide and engageable with said sector to lock said lever against movement, a member, means cooperating with said member to cause the latter to exert a force against said dog having a lateral component urging said dog against the side of said guide and a longitudinal component urging said dog into engagement with said sector, and means tending to separate said dog and said member.

18. In a lever mechanism, the combination with a sector, of a lever mounted for movement relative to said sector, a guide on said lever, a dog longitudinally movable in said guide and engageable with said sector to lock said lever against movement, a longitudinally movable member, means cooperating with said member to cause the latter to exert a force against said dog having a lateral component urging said dog against the side of said guide and a longitudinal component urging said dog into engagement with said sector, and means connected with said member to move the latter in a direction to release the force exerted against said dog and means tending to separate said dog and said member.

19. In a lever mechanism, the combination with a sector, of a lever, a guide on said lever having two parallel sides, a dog slidingly disposed in said guide, and a wedge in said guide operating against one side of said guide and against said dog urging said dog against the opposite side of said guide to lock said dog in engagement with said sector and against movement relatve to said guide.

TALBERT W. PAUL.